United States Patent
Igarashi et al.

(10) Patent No.: US 6,934,048 B2
(45) Date of Patent: Aug. 23, 2005

(54) IMAGE DATA PROCESSING SYSTEM AND SERVER SYSTEM

(75) Inventors: Takashi Igarashi, Hino (JP); Hiroyuki Iizuka, Hino (JP); Hiroshi Ikeda, Hino (JP)

(73) Assignee: Konica Corporation (JP)

( * ) Notice: Subject to any disclaimer, the term of this patent is extended or adjusted under 35 U.S.C. 154(b) by 654 days.

(21) Appl. No.: 09/956,535

(22) Filed: Sep. 19, 2001

(65) Prior Publication Data

US 2002/0080397 A1 Jun. 27, 2002

(30) Foreign Application Priority Data

Sep. 19, 2000 (JP) ........................................ 2000-283984

(51) Int. Cl.$^7$ .............................................. G06F 15/00
(52) U.S. Cl. ..................................... 358/1.15; 358/1.18
(58) Field of Search ......................... 358/1.1, 1.5, 1.11, 358/1.12, 1.13, 1.14, 1.15, 1.16, 1.17, 1.18

(56) References Cited

U.S. PATENT DOCUMENTS

| | | | |
|---|---|---|---|
| 5,784,461 A | | 7/1998 | Shaffer et al. |
| 6,321,231 B1 | * | 11/2001 | Jebens et al. ............ 707/104.1 |
| 6,381,029 B1 | * | 4/2002 | Tipirneni ................... 358/1.14 |
| 6,574,629 B1 | * | 6/2003 | Cooke et al. ................. 707/10 |
| 6,708,309 B1 | * | 3/2004 | Blumberg .................... 715/530 |

FOREIGN PATENT DOCUMENTS

| | | |
|---|---|---|
| EP | 0 856 972 A2 | 8/1998 |
| EP | 0 878 956 A1 | 11/1998 |

OTHER PUBLICATIONS

European Search report EP 01 12 2307 dated Sep. 5, 2003.

* cited by examiner

*Primary Examiner*—Mark Wallerson
(74) *Attorney, Agent, or Firm*—Cantor Colburn LLP (57) ABSTRACT

An image data processing system, comprises first and second storing sections; an administrative control section to administrate the image data stored in the first storing section or the reduced image data stored in the second storing section; an authenticating section to conduct an authenticating process for an access from a customer terminal on a network; the administrative control section making it possible for the customer to peruse the reduced image data when the authenticating section is accessed with the provisional ID and the administrative control section capable of conducting a receiving process for a member ID; and the administrative control section making it possible to receive an operation for at least one of the reduced image data in the second storing section and the image data stored in the first storing section.

36 Claims, 7 Drawing Sheets

DATA TABLE

| NAME OF DATA | PRODUCING DATE | THUMBNAIL FLAG | CORRESPONDING ORIGINAL IMAGE | ID(BEFORE SHIFTING) | | ID(AFTER SHIFTING) | |
|---|---|---|---|---|---|---|---|
| image-data 0705-001 | | JULY 5 | | receipt ID-0001 | | | |
| image-data 0705-002 | | JULY 5 | | receipt ID-0001 | | | |
| image-data 0705-003 | | JULY 5 | | receipt ID-0001 | ⇒ | member ID-xxxx | KEEP |
| image-data 0705-004 | | JULY 5 | | receipt ID-0001 | | | |
| image-data 0705-005 | | JULY 5 | | receipt ID-0001 | | | |
| image-data 0705-006 | 1 | JULY 5 | image-data 0705-001 | receipt ID-0001 | | | |
| image-data 0705-007 | 1 | JULY 5 | image-data 0705-002 | receipt ID-0001 | ⇒ | member ID-xxxx | KEEP |
| image-data 0705-008 | 1 | JULY 5 | image-data 0705-003 | receipt ID-0001 | | | |
| image-data 0705-009 | 1 | JULY 5 | image-data 0705-004 | receipt ID-0001 | | | |
| image-data 0705-010 | 1 | JULY 5 | image-data 0705-005 | receipt ID-0001 | | | |
| image-data 0705-011 | | JULY 5 | | receipt ID-0002 | ⇒ | member ID-xxxx | KEEP |
| image-data 0705-012 | | JULY 5 | | receipt ID-0002 | | | |
| image-data 0705-013 | 1 | JULY 5 | image-data 0705-011 | receipt ID-0002 | ⇒ | member ID-xxxx | KEEP |
| image-data 0705-014 | 1 | JULY 5 | image-data 0705-012 | receipt ID-0002 | | | |
| ...... | | | | ...... | | | |

IMAGE DATA PROCESSING SYSTEM AND SERVER SYSTEM

BACKGROUND OF THE INVENTION

The present invention relates to an image data processing system, more particularly to an image data processing system or server system capable of perusing and processing memory-stored image data as required.

In recent years, digital cameras and home-use digital printers have been rapidly proliferating, owing to improvement in image processing technology. Along with this, actual users', knowledge and understanding of the usefulness of digital images are also becoming deeper and these products are coming to be used in various applications such as creating Internet homepages and printing digital data. In the meantime, the image output centers and minilabs (small-scale photofinishing laboratories) providing an image print service, and big labs with centralized processing capabilities are also naturally increasing as service providers who handle digital image data, and variations of digital image data services are diversified.

It is known as an example of such digital image data services that at a photo shop, the customer, after uploading the image data of a negative film into a server made open on the Internet, can make requests for reprints and place an order for a premium such as a photo mug or T-shirt, based on the authentication information pre-assigned to that customer only. Customers who are permitted to peruse image data can also receive a similar service.

Such service available under prior art, however, poses several problems. That is to say, although no problems arise when the number of customers wishing to receive the service is small, as the Internet proliferates, service providers are coming to be required to keep and handle not only negative films but also various other types of storage media ranging from analog hardcopies such as prints and reversal films, to such compact flashes, SMART media, memory sticks, and SD memory cards as used in digital cameras or other storage media. Also, since image data may be disclosed on the Internet unconditionally as a service, the number of customers wishing to receive the service is likely to increase significantly. In such a case, as this number of customers increases, it will take greater deals of time and labor for the service provider to check for matching between the authentication information pre-assigned to the customer and actually entered data. In addition, when convenience stores can be used as a supply window for the service, it is difficult to familiarize all staff of the convenience store with a complex acceptance procedure similar to that of prior art, and it is therefore desirable that the acceptance operations be made as simple as possible. Besides, in such case of convenience stores as mentioned above, since all service requests accepted at a plurality of shops need to be processed in one place, further simplification of operations is required.

Furthermore, a more efficient administrating system is also required for the image data print accounting process.

In addition, there is the problem that when a great volume of image data is uploaded into the server, indifferent storage of the image data over an extended period requires the expansion of the server in storage capacity and thus results in vast initial costs and maintenance costs. Providing massive image data indifferently on the Internet also poses the problem that communications traffic becomes enormous; in some cases, a server failure occurs.

SUMMARY OF THE INVENTION

It is the object of the present invention, in view of such problems associated with prior art, to supply an image data processing system that is easy for both the customer and the service provider to use.

The above object can be accomplished by an image data processing system that comprises a first storage unit in which is stored the image data corresponding to the provisional ID which has been issued to the customer, a second storage unit in which is stored the size-reduced image data corresponding to said image data, a administrative control unit for managing the size-reduced image data stored within said second storage unit or the image data stored within said first image data, and a means for authenticating the access made from the customer terminal on the network, where said administrative control unit enables image data to be perused by, when access based on said provisional ID is received by said authenticating means, giving the right to access said second storage unit and transmitting the size-reduced image data within said second storage unit to the customer terminal, and can process the acceptance of the member ID of the customer.

In addition, said administrative control unit accept operations relating to at least either one of two types of data, namely, said first image data or said second image data, when input of said member ID is accepted by the authenticating means.

The above object can be also accomplished by an image data processing server system that comprises a administrative control unit for managing such image data stored within a first storage unit that corresponds to the provisional ID which has been issued to the customer, or for managing the size-reduced image data stored within a second storage unit, and a means for authenticating the access made from the customer terminal on the network, where said administrative control unit enables image data to be perused by, when access based on said provisional ID is received by said authenticating means, giving the right to access said second storage unit and transmitting the size-reduced image data within said second storage unit to the customer terminal, and can process the acceptance of the member ID of the customer. In addition, said administrative control unit accept operations relating to at least either one of two types of data, namely, said first image data or said second image data, when input of said member ID is accepted by the authenticating means.

It is possible for image data to be perused at the customer site by supplying the image data from, for example, said first storage area (such primary storage area as provided in said second storage unit) for a fixed period. Also, the customer, after perusing the image data, can minimize the storage capacity of said second storage area (such secondary storage area as provided in said third storage unit) by moving only the desired image data to said second storage area. In addition, the storage capacity of said first storage area can be minimized by erasing the image data within said first storage area after the data has passed a fixed period.

For example, when receiving a negative film from the customer and accepting requests for simultaneous printing, the lab defines provisional authentication information (first authentication/provisional ID information) with each acceptance operation and returns the prints to the customer with attached provisional authentication information and password. When creating prints, the lab converts the images into digital data by use of a scanner, then after storing the data together with said provisional authentication information into the Server of the lab and creating thumbnail images, and creates those prints and lists them as, for example, an album, in the WWW Server (Center Server) so that the customer can access the contents of the list from his or her home through the Internet.

In this system, all that is required for the customer to perform is just to refer to his or her own album created on the Internet, by operating his or her personal computer, and move only necessary image data after acquiring official ID (second authentication/member ID) information. Also, the load on the Server (first storage area) can be reduced by deleting unnecessary provisional ID data unconditionally in short-term timing such as one week after the data was created. It is possible to assign authentication information without fail to all operations and to reduce the load on the WWW Server, by, in the way described above, creating data temporarily with provisional ID information and then moving the data, as required, to either a permanent area, an area longer than said first storage area in terms of storage period, or an area successively expandable in terms of storage period (namely, said second storage area). In addition, the load on the WWW Server can be further reduced by assigning a shorter provisional disclosure period. An official ID can be acquired by entering the required information (for example, membership information) from the personal computer.

In addition to prints, negative films, and positive films, media into which image data is stored refers to FDs, CD-Rs, MOs, DVDs, and other recording media intended for the storage of digitized image information. Also, one unit of image data refers to, for example, one film of data (24 frames if the film is of the 24-frame type) or one FD of data. In addition, the access method refers to, but is not limited to, a personal computer, cellular phone, PDA, or the like that can access said storage means via the Internet.

Furthermore, when image data is moved from said first storage area to said second storage area, if said second authentication information different from said first authentication information is linked to said image data, convenience will be enhanced since the system will be usable according to situation. For example, it will be possible for said first storage area to be accessed free-of-charge or for said second storage area to be accessed only at the customer's expense.

Also, when said second storage area is accessed via the network, in addition to permitting the provision of the above-stored image data in accordance with said second authentication information, providing a means for processing said image data as required enables the system to meet more needs of the customer, since, for example, an image processing service relating to postcards and calendars can be supplied at the request of the customer.

Furthermore, even if the image data supplied in accordance with said first authentication information is the same thumbnail image data, varying its resolution (images supplied in accordance with the first authentication information are lower in resolution) and reducing the volume of data to a level lower than the volume of image data supplied in accordance with the second authentication information will enable the storage capacity of said first storage area to be reduced.

Also, it is preferable that said image data that has been stored into said first storage area should be erased within a period shorter than that of the image data stored within said second storage area, and after a fixed period.

Furthermore, said first storage means and said second storage means can either be the same or different.

Also, when the customer modifies the attributes only of the image data to undergo processing, the storage capacity of the required storage area into which the image data existing after the attributes have been modified can be reduced. The storage capacity of said first storage area can also be reduced by erasing, after the elapse of a fixed period, image data whose attributes have not been modified.

"Modifying the attributes" here means modifying data accompanying the image data, in such a manner that service contents based on the particular image data will differ between the case that the image data is accessed in accordance with the first authentication information, and the case that the image data is accessed in accordance with the second authentication information.

Furthermore, after the attributes of said image data have been modified, if second authentication information different from said first authentication information is linked to said image data, convenience will be enhanced since the system will be usable according to situation. For example, although the image data existing before the attributes were modified can be perused at the customer's expense, the image data existing after the attributes have been modified can be perused only at the customer's expense.

DETAILED DESCRIPTION OF THE PREFERRED EMBODIMENTS

The present invention is described below using the drawings that show its embodiments.

Figure 1:
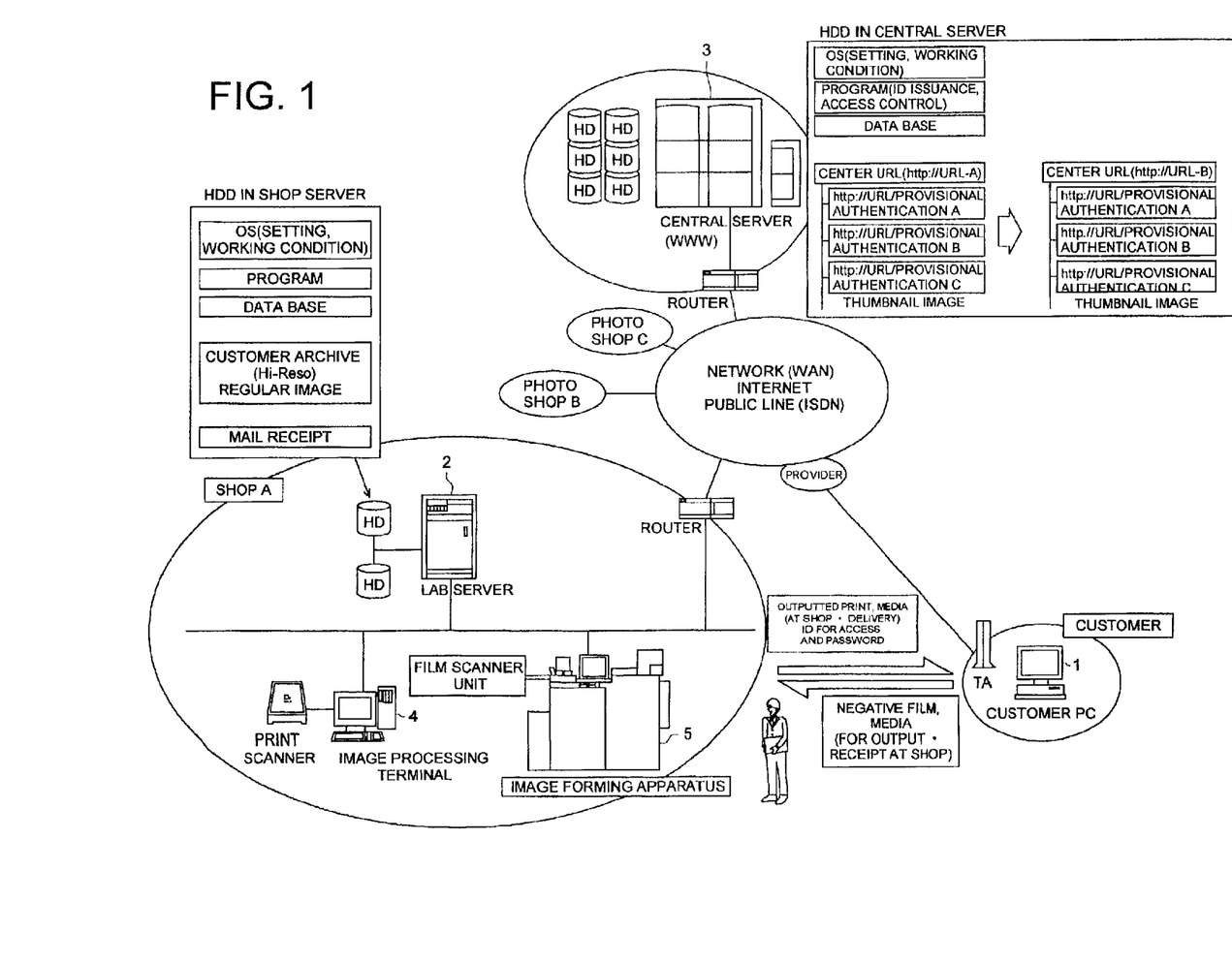
FIG. 1 is a diagram showing a network service system that includes the image data processing system pertaining to an embodiment of the present invention.

FIG. 1 is a diagram showing a network service system that includes the image data processing system pertaining to an embodiment of the present invention. Customer terminal (personal computer) 1, Lab Server 2 with a hard disk, and WWW Server (Center Server) 3 also equipped with a hard disk are connected to a network WAN such as the Internet. At the lab, Lab Server 2 is connected to an image processing terminal 4 and an image forming unit 5 via a network such as an LAN. WWW Server 3 forms a second storage means (said hard disk) which is provided with a first storage area and a second storage area, and a permission (authentication) means. Lab Server 2 forms a first storage means (said hard disk), a means by which image data that has been digitized in the lab by use of a scanner is linked to first authentication information, and a printer for creating prints by processing print information that has been created from second authentication information.

Figure 2:
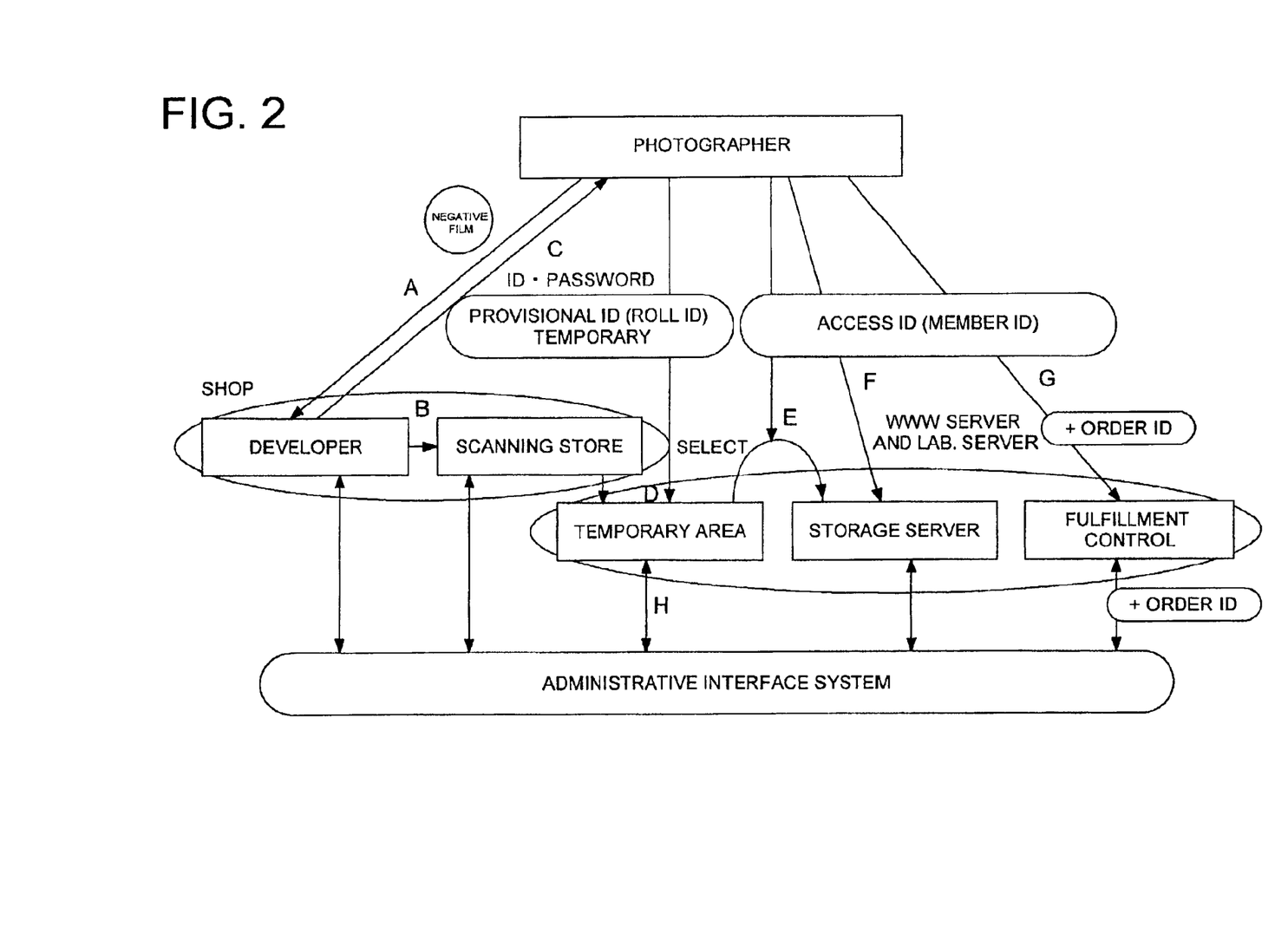
FIG. 2 is a schematic diagram showing the system pertaining to the present invention.

Next, the way the service is supplied using the system is outlined below using FIG. 2. This outline is given in line with the service supply procedures denoted by symbols A to H in the figure.

[Procedure A]

The customer visits a photo shop with a negative film on which images were recorded, or with a compact flash card (CF) on which is recorded image data that was acquired using a digital camera, and makes a request for printing. At the photo shop, the images, if recorded on the negative film, first undergoes processing and are then printed, or if recorded on CF, the image data stored thereon is directly printed. When the above processes are performed, photo shops usually manage production and accounting operations using one receipt ID (SCAN ID, ROLL ID) for one order, as first authentication.

[Procedure B]

In parallel with or before or after the printing process, the images on the negative film are first scanned using a film scanner. Next after the scanned images have been converted into digital images, these images are linked to the receipt ID that was used when the order was received, and then the images are stored into a storage area of the Lab Server in the photo shop. In this case, thumbnail images should also be created and linked simultaneously with the above digital images to allow for convenience in later processes. If digital image data is carried in by the customer from the beginning, the image data will be stored into a storage area of said Lab Server in the photo shop after thumbnail images are created.

[Procedure C]

When the prints are returned to the customer, the corresponding receipt ID and the equivalent of his or her password are presented and the customer is notified to the effect that the image data can be confirmed on the Internet and that the data can be reprinted and disclosed to his or her friends as required. The password can be a random character string or the information, such as phone number, that the customer is to give to the photo shop when placing an order for printing.

[Procedure D]

Next, in order to enable the customer to access the thumbnail images via the Internet, these images are stored into a temporary storage area connectable to the Internet, such as a storage area within the storage unit of the Center Server. The images that have thus been stored into a temporary storage area can be accessed after being checked against the receipt ID and password that were assigned beforehand.

[Procedure E]

Since these images stored within the temporary storage area are deleted after a fixed period, an area is supplied that enables the customer to store those images as desired. In this case, a separate accounting process is required and for this reason, the customer needs to acquire official member ID (Access ID, Member ID) information as the second authentication information necessary to receive the service. If the customer has already acquired his or her member ID, the desired image data can be moved to an image storage area (the required storage area within the Image Server: secondary storage area) by relinking the member ID and the selected image data. Moving the image data to the image storage area means that the thumbnail images can be physically copied or that modifications can be conducted by performing operations on the database managing the image data.

[Procedure F]

The customer can request printing, and permit close friends to peruse his or her image data, by specifying the necessary number of prints and the size for the image data, provided that the particular image data has already been stored within the image storage area and is managed under the member ID of that customer. When printing is requested, in particular, an order ID will be created along with the appropriate printing order information, then Fulfillment Control will perform an accounting process, and accounting information will be given to the customer by an electronic transmission means such as e-mail.

[Procedure G]

Printing order information is also supplied to the photo shop and the printing process is performed using the image data stored within the storage area of the photo shop. Hereby, prints can be delivered to the customer over the counter. The charges for the prints can be settled down beforehand using a credit card when the printing order is placed, or they can be settled down when the prints are delivered.

[About the Administrative Interface System]

Figure 3:
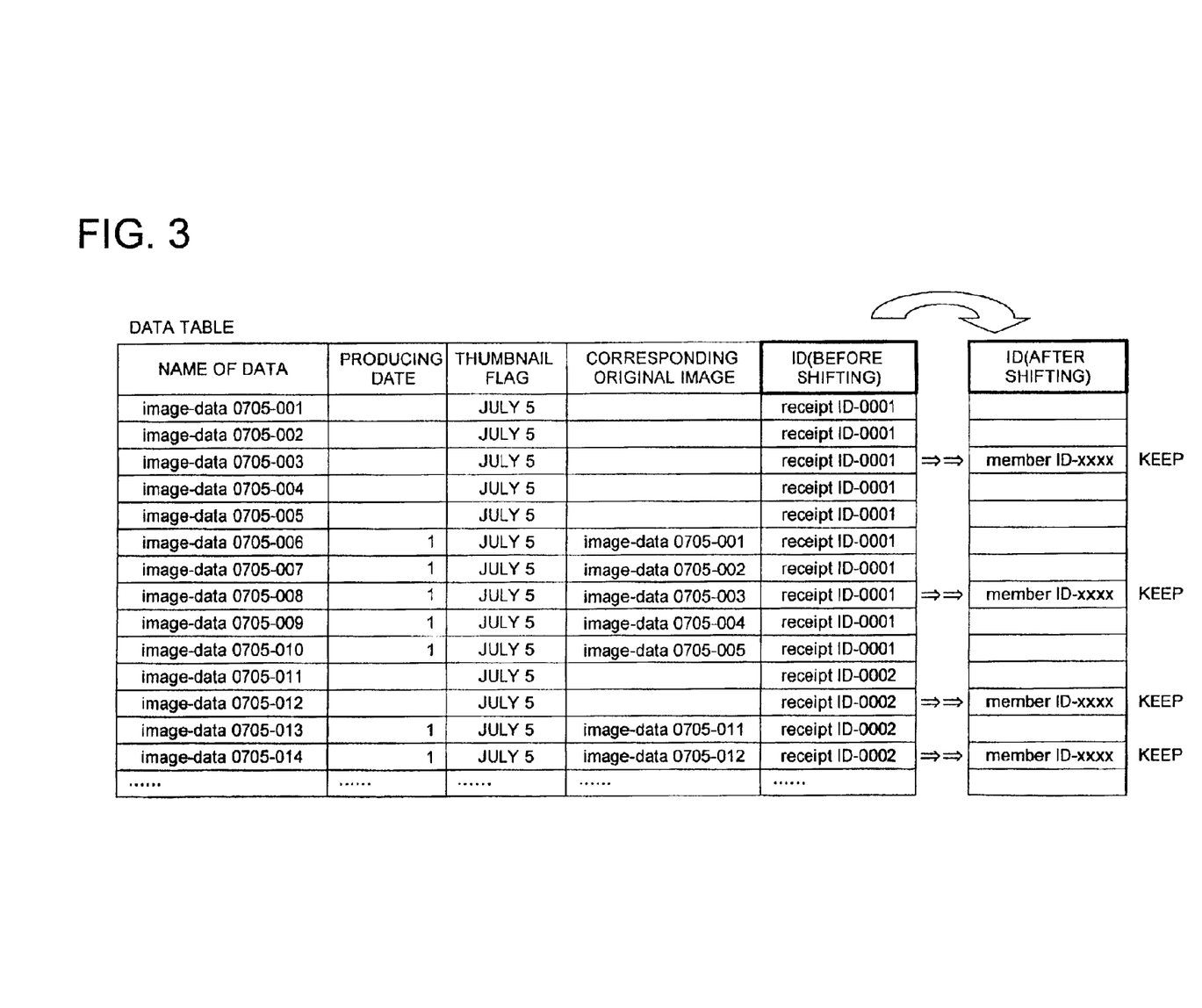
FIG. 3 is a diagram representing the relationship between image data and the corresponding data.

By the way, database management is undertaken by the Administrative Interface System. Since the Administrative Interface System can conduct image data ID management, customer receipt ID—member ID linking, and other tasks, in integrated form, mismatching will not occur, even if data processing is executed in a plurality of storage areas. For example, image data that has been scanned in the photo shop is first assigned an ID based on the receipt ID of the customer and on what number image data in the order the processed image data is, and then the image data is stored into the storage area of the Server in the photo shop. At the same time, the corresponding thumbnail images are also stored after a flag identifying the thumbnail images has been set up. See FIG. 3.

Next, for example, if the above-mentioned thumbnail images are stored into said secondary storage area, although the ownership for the image data is transferred from the person having the receipt ID to the person having the member ID, the printing order can be accepted by moving the ID information section corresponding to the image data, from the receipt ID to the member ID via the Administrative Interface System. See FIG. 3.

Management of "Printing Ordered", "Printing in Progress", "Now in Transport", "Possible to Receive Prints", and other order-receiving status information during the creation of prints . . . namely, tracking . . . can also take place using the required management area. In addition, the corresponding service can be supplied through the Accounting Management Center at the request of the customer.

Next, two examples of the modes of image data movement inside the Lab Server are shown below.

EXAMPLE 1

Figure 4:
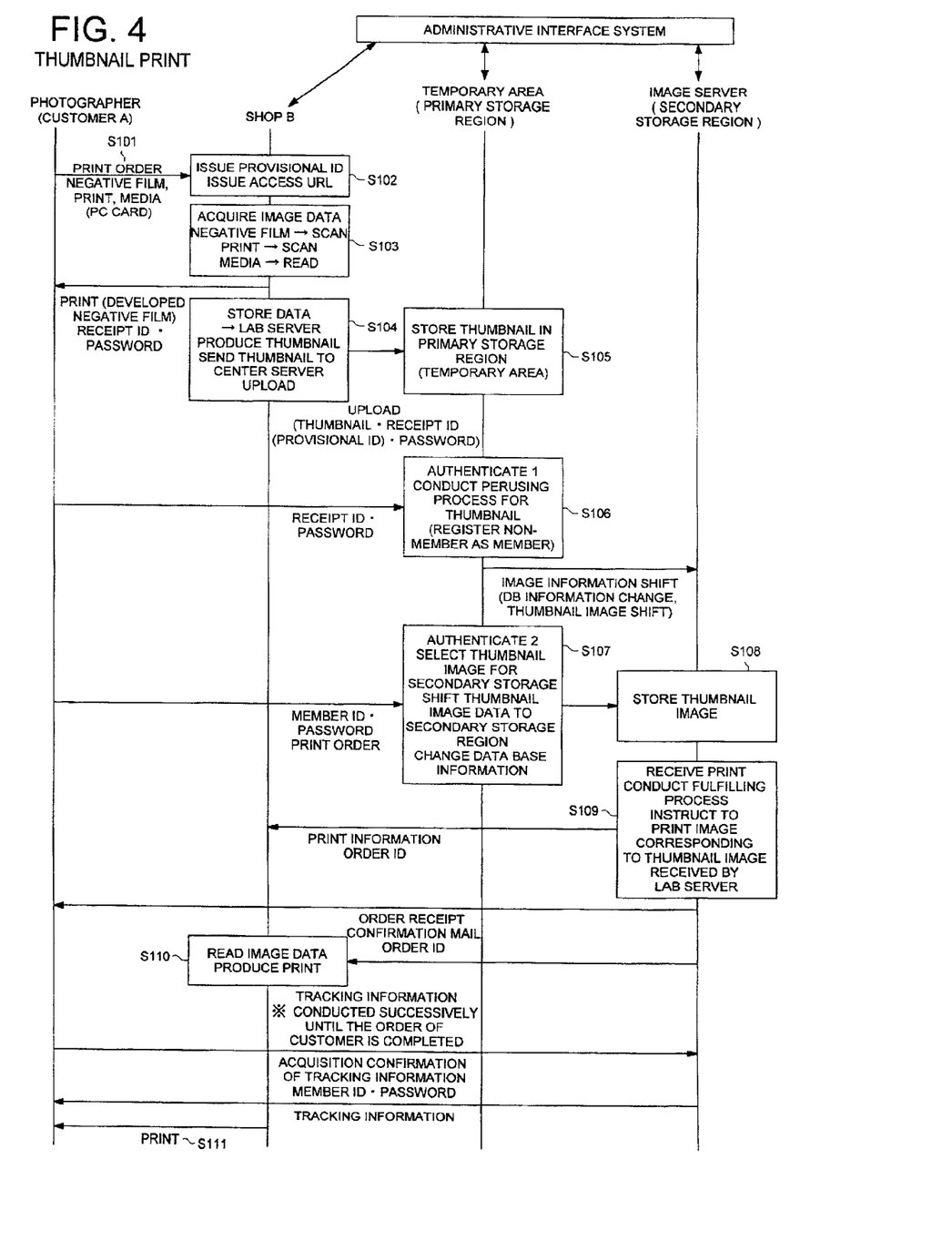
FIG. 4 is a diagram showing a first example of exchanging data between the customer, the lab, and the Server.

FIG. 4 is a diagram showing data exchange between the customer, the lab, and the Center Server. First, customer A visits lab B with an unprocessed negative film which is a medium that contains image information, or with media on which image data is recorded. In the case of an unprocessed negative film, printing is to be requested simultaneously with processing. (S101)

For example, in the case of a negative film, a clerk of lab B stores the negative film into a DPE bag, and at this time, asks the contact phone number of customer A. This phone number can be used as the password for customer A to later access the web page. Also, DPE bags are usually marked with the shop code (unique key) and a serial number and since the shop code and the serial number are unique and do not overlap, they can be used as an authentication code (provisional ID). (S102)

In other words, the use of a new DPE bag means that a provisional ID (also called "receipt ID or first authentication information") is issued.

Also, the clerk attaches to the negative film a label bearing the same number as that of the DPE bag, namely, a provisional ID, in order to avoid mismatching between the DPE bag and the as-processed negative film. If images are to be stored onto a CD-R or the like and returned to the customer, a label of the same number can be attached to that CD-R as well. At this time, one negative film is usually counted as one order. When a plurality of films are received from the customer, therefore, although more than one authentication code is to be generated even during one accepting operation, the plurality of negative films can, of course, undergo processing with one authentication code.

After that, lab B processes the negative film, then prints the film by use of image forming unit 5, and acquires image data by conducting image conversions with a scanner 5a, an image data acquisition means. (S103)

Figure 5A:
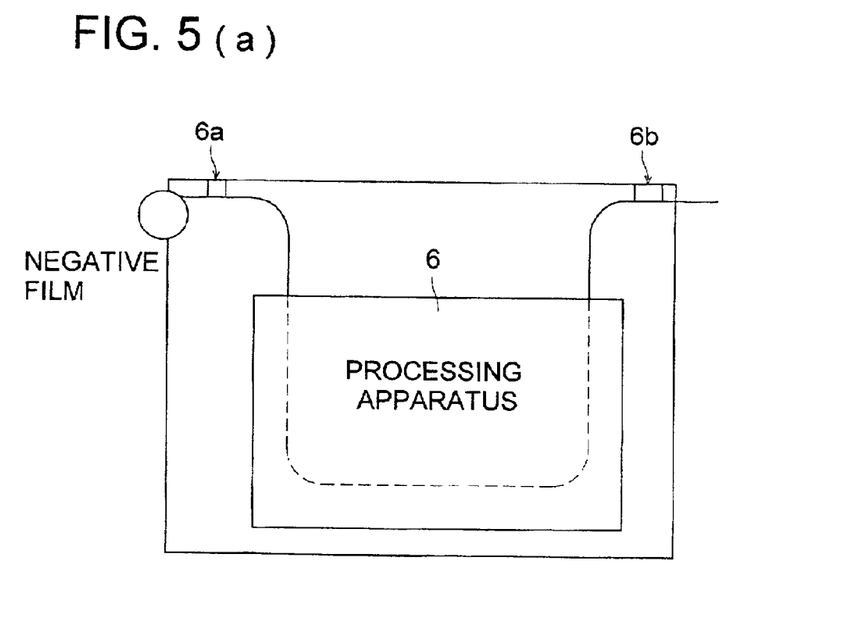
FIGS. 5(a) and 5(b) are diagrams showing an example of a negative film processing system configuration.

A transparent label onto which the required authentication code is printed can be attached to the negative film, onto which that number can then be printed using an exposure machine or the like. Thus, the negative film and the authentication code can be linked. FIG. 5(a) shows an example in which a negative film processing unit 6 with a means for linking negative films and authentication codes is used. In this case, the authentication code is usually to be exposed using exposure machine 6a connected to negative film processing unit 6. However, the negative film, after being processed, can also be printed by providing an ink jet printer at position 6b.

Figure 5B:
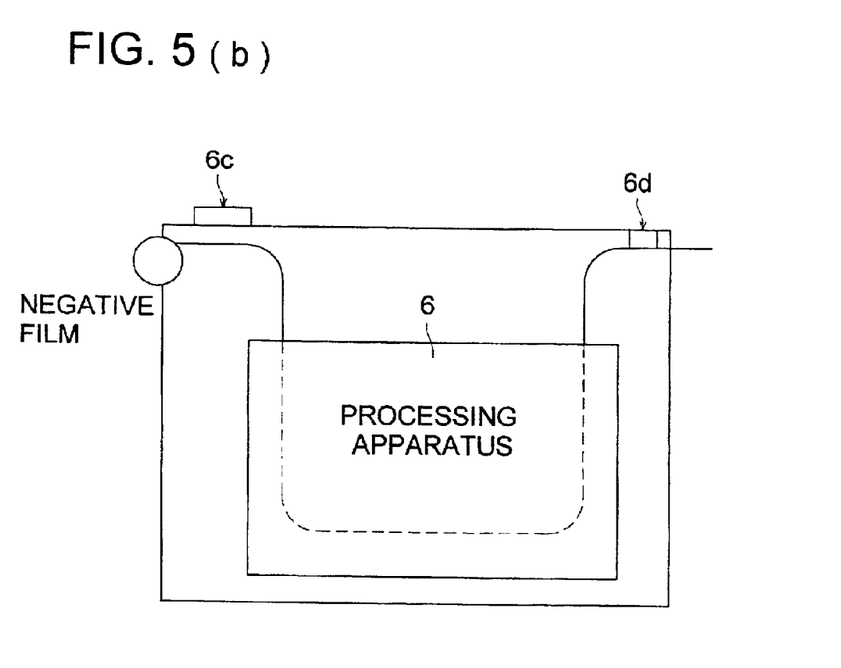

In addition, as shown in FIG. 5(b), the clerk can also enter the authentication code manually via a code input means 6c and can read the code by operating a film scanner 6d. Furthermore, when the contents of a compact flash or other media are to be read into a reader, the media contents and the authentication code can be automatically linked by storing the code into a memory during the reception of the service request. After the authentication code has been linked, multiple orders of data can also be stored onto other media if this is possible over the counter.

By so doing, the media (usually, one medium) can be returned over-the-counter to the customer.

After this, the clerk loads image data from the negative film while at the same time printing the film, and stores image data of a full size into Lab Server 2 (S104). When the image data is stored into the Server, the stored image data will be searched for using print information that has been created from the second authentication information described later in this document, and then the image data will be linked so as to enable the creation of prints using a printer connected to Lab Server 2.

Examples of linking are shown below.

A. The same directory as that of the authentication code is to be created in Lab Server 2 and the image data is to be stored under this directory (time can be confirmed from the file creation time).

B. A file name is to be created with the image reading time, and the file name and the authentication code are to be recorded in a management database so as to enable searching. It is one minimum requirement that the authentication code and the image data be already linked. At the same time, the data creation time, the service request reception time, and other information are also required for the management of the saving period.

Although the authentication code is automatically entered by the film scanner or the like or the code that was labeled before the film underwent processing is manually entered by the clerk, the code can likewise be read by being converted into a bar code by use of a bar code reader. Or, as shown in FIG. 5(b), the code may be read using film scanner 6d built into negative film processing unit 6.

Also, thumbnail images are created from the image data saved in Lab Server 2. Created thumbnail image data is then uploaded into the Center Server.

Uploaded image data is stored into WWW Server (Center Server), the first storage area. (S105). Similarly to the above, the corresponding image data (thumbnail image data) is linked to the first authentication information (the number marked on the DPE bag).

The required URL is assigned to the image data storage area, which can be accessed via the Internet.

The clerk delivers to customer A the prints, the negative film, and the information required for access from the Internet to the area in which the image data is stored. The information required here refers to the following:

a) The URL necessary to peruse the images (Example: http://www.konica.net), b) access authentication code (the number marked on the DPE bag), and c) password.

(More specifically, the homepage is accessed from the personal computer and then the access authentication code and the password are entered. Thus, the required images are displayed.)

Another possible example of information may take the form in which the authentication code is included in the URL required for image perusing (Example: http://www.konica.net/jp00001-AS12543/). In this example, the shop code is taken as "jp00001" and the membership code is taken as "AS12543." Accessing the required URL displays a password input request, and responding to this request by entering the password displays the required images. Since the saved image data at this time is only provisional, the capacity of the Server can be reduced by limiting the access period to a short term such as one week.

Figure 6A:
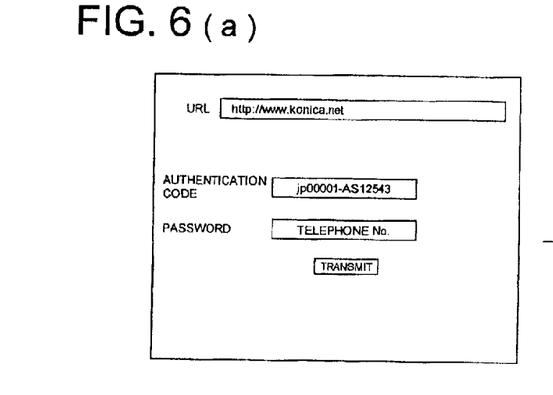
FIGS. 6(a) to 6(d) are views showing examples of screen displays at the personal computer of the customer.
Figure 6B:
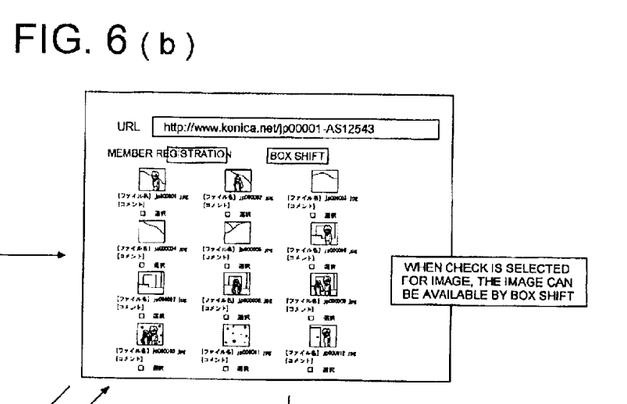

Customer A accesses WWW Server 3 via the Internet from the personal computer installed in his or her home, and enters the (first) authentication code and the password as shown in, for example, FIG. 6(a). Based on the authenticating process, image data that has been linked to the first authentication code within said first storage area is then perused (S106), and customer A can access the storage area containing his or her own image data and can peruse the images. See FIG. 6(b).

Figure 6C:
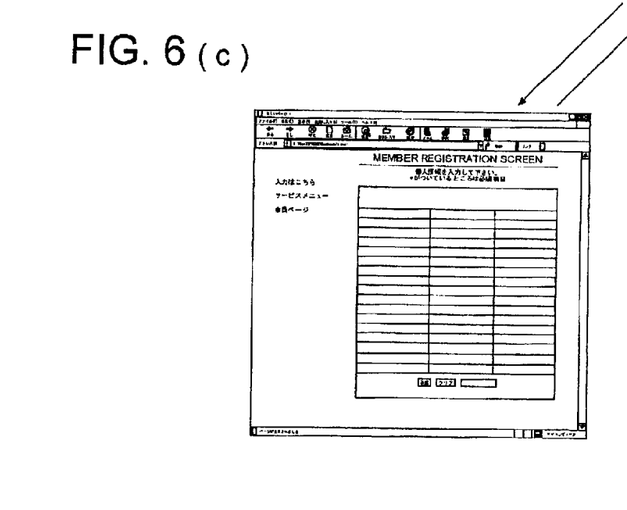

At this time, if customer A is not registered as a member permitted to use the network services and wishes to reprint the negative film for the desired images, to show the images to other people, to convert the images to mugcups or T-shirts, or to integrate a greater volume of image data over a long span (in extreme cases, one year, 10 years, or lifetime), or desires to receive other services high in added value, it is necessary for this customer to take the required member registration procedures. If this customer is undoubtedly not a member, he or she can move control to a member registration display on the Internet. See FIG. 6(c).

Figure 6D:
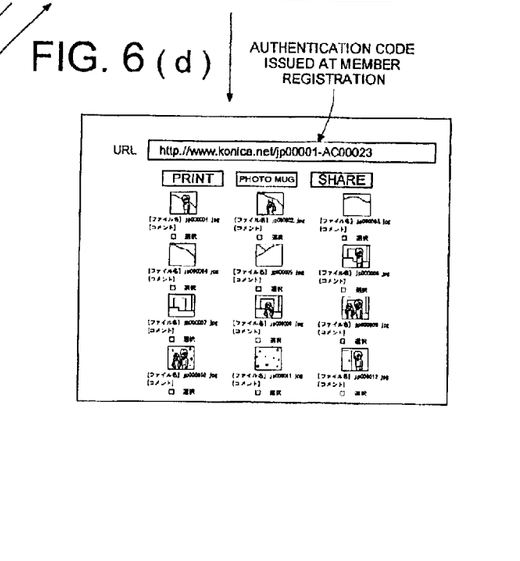
Figure 7:
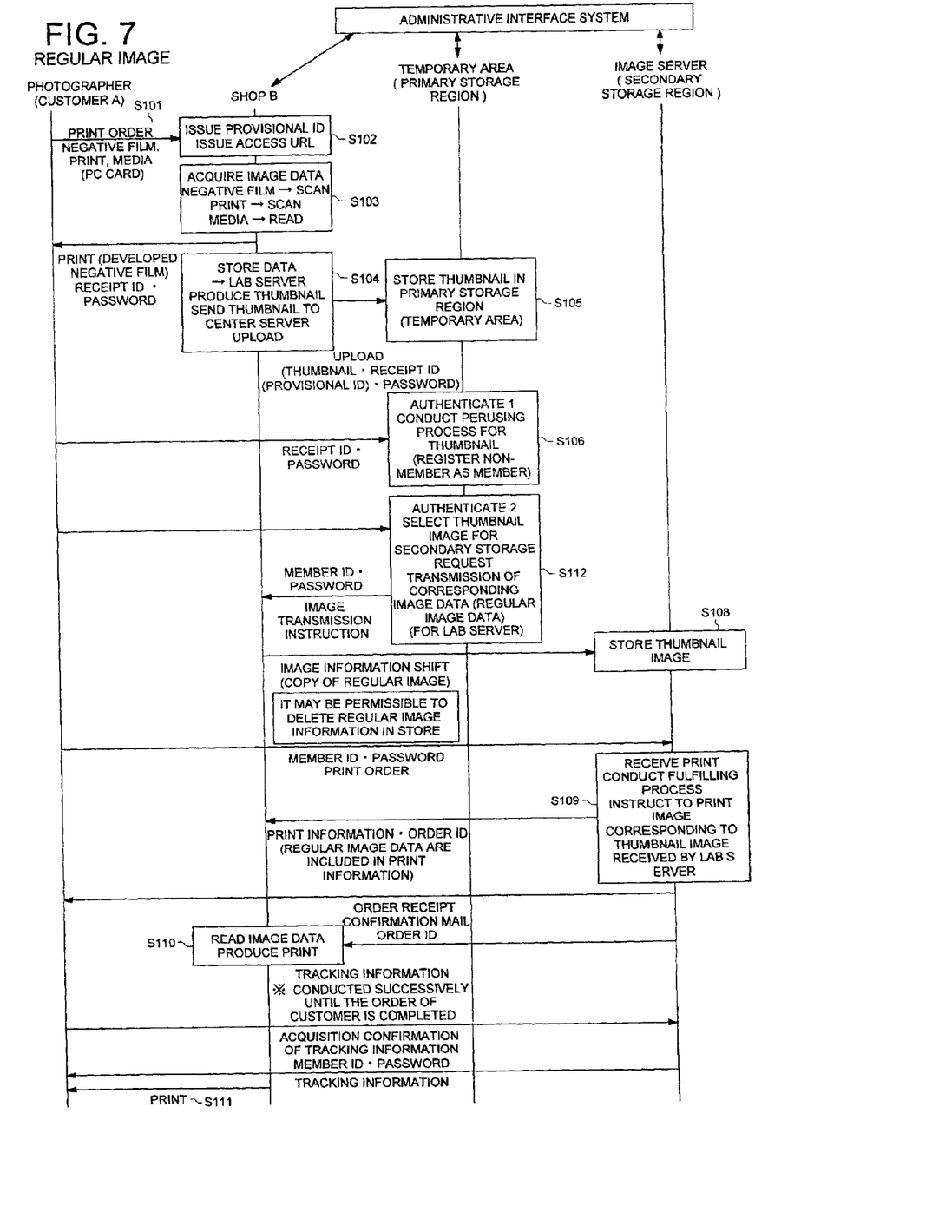
FIG. 7 is a diagram showing a second example of exchanging data between the customer, the lab, and the Server.

Since it requires an exchange in cash (or credit card), member registration takes place to confirm the creditability of customer A when the acceptability of printing is judged. Member registration can be executed by entering, for example, the name, address, e-mail address, phone number, credit card number, etc. of customer A from the display at personal computer 1. (Said S106). A new (second) authentication code identifying that the customer has become a network service member will then be issued (this code is equivalent to AC00023 in FIG. 6(d)). Depending on the particular situation, an automatically created password or the password requested by the customer will also be issued. Partly for the purpose of protecting the member information, such member registration needs to be protected using a security function such as Secure Sockets Layer (SSL).

When customer A who has been registered as a member enters the above-mentioned new authentication code and the password, selects the image for which the above service is to be used, and presses the button required for image data movement, the image data within the selected first storage area will move to the second storage area within WWW Server 3 (S107, S108). The movement here refers to actually moving or copying the selected image data from the first storage area within WWW Server 3 to the second storage area.

Instead of the method described above, the customer can peruse the desired image data by modifying its attributes seeing the image data stored within the Server, the first authentication number and second authentication number relating to the particular image data, and the database identifying its presence, without actually moving any images.

If the image data within the first storage area is moved using the method described above, image data stored within Lab Server 2 will be linked to a newly issued authentication code. At this time, although linking can be controlled just by modifying the database by use of said Administrative Interface System, the corresponding image data itself within the Lab Server can also be stored into another storage area of Lab Server 2.

In this case, for example, when the customer wishes to create an album, to create mugcups, or to reprint the negative film, the storage area can also be divided into a plurality of directories to suit the particular needs of the customer and each image can be stored into separate directories once again.

Next, when, as described above, printing in the lab is to be executed, print information associated with second authentication is created and delivered to the lab. The print information usually contains: image data associated with second authentication; the type of printing; the quantity of printing; the printing charge settlement method; the print receiving means; and other information. (S109)

In this case, since printing uses the image data of Lab Server 2, the attributes of the image data existing on Lab Server 2 also needs to be modified according to the particular operations of the customer.

In lab B, the image data of Lab Server 2 is used to print the negative film according to the particular type of order data corresponding to the above service (S110).

Although customer A can receive the corresponding prints over the counter on a cash-on-delivery basis (S111), he or she can also pay on a postal money order basis, or use credit card settlement, or pay by mail, not in cash over the counter. Image data associated with provisional (first) authentication data is deleted one week after the images have been stored into WWW Server 3. Officially authenticated data, however, is saved in Lab Server 2, only for the period pursuant to the provisions of the contract.

According to the above example, the storage capacity of said secondary storage area can be reduced.

Also, since only thumbnail images are transmitted between Lab Servers and between Center Servers, there is no need to transmit the particular image data, with the result that communications costs, time, and traffic can be reduced significantly. In addition, the storage capacity of said first secondary storage area can be reduced and this storage capacity can be further reduced by erasing stored image data from said first secondary storage area after the elapse of a fixed period. This fixed period becomes essentially the same as the term of validity of said provisional ID.

It is possible to assign authentication information without fail to all operations by, in the way described above, creating data temporarily with provisional ID information and then moving the data, as required, to either a permanent area, an area longer than said first storage area in terms of storage period, or an area successively expandable in terms of storage period (namely, said second storage area). It is also possible to reduce the loads on the WWW Server and Center Server by assigning a shorter provisional disclosure period.

In addition, since said primary storage area and secondary storage area are divided for the management of the accounting and print receptance processes, management loads are reduced and processing is progressed efficiently. Furthermore, the image selectability and convenience of the user improve.

EXAMPLE 2

Although, in the first embodiment set forth above, only the movement of thumbnail images or the modification of attributes takes place in primary and second storage areas with Lab Server 2 taken as the image storage location to be used for printing, the printing process can also be conducted by storing into the Center Server the image data to be used for printing, pursuant to second authentication, and sending the necessary image data to the Lab Server via the Internet. FIG. 6 is a diagram showing the processes. The same processes as those shown in FIG. 4 are assigned the same numbers (S101 to S106, and S108 to S111).

Processing differs from that of FIG. 4 in that based on the authentication of the member ID, the original image data that has been stored into the Lab Server is stored into the Center Server.

When accessed using the member ID, the Center Server searches for and displays the thumbnail images corresponding to that member ID. When the movement of a specific thumbnail image is specified by customer A to whom the member ID is assigned, the Center Server will request the Lab Server to transmit the original image data (full-size image data) corresponding to the above-mentioned specific thumbnail image. In response to this request, the Lab Server will transmit only the corresponding original image data from the storage unit to the Center Server. The Center Server will then store the received image data into the secondary storage area mentioned above.

Hereafter, if a printing order is placed by customer A having the member ID, the a printing instruction will be sent with the order ID, including the image data corresponding to the print information, to the Lab Server.

The original image data within the photo shop (Lab Server) can either be saved or be deleted. Since the management of image data can be left up to the judgment of the system administrator to allow for the possibility of reordering, automatic integrated management of all image data by the Administrative Interface System prevents confusion from occurring.

Also, in said processes S112 and S109, it is possible to store the particular image data into the secondary storage area and, at the same time, to move thumbnail image data from the primary storage area to the secondary storage area.

In addition, although, in the above example, original image data is moved to the Center Server in accordance with said second authentication, it is possible to move the original image data to the primary storage area within the Center Server before said first authentication code is issued, and then further move the original image data together with the corresponding thumbnail images from the primary storage area to the secondary storage area in accordance with said second authentication. In this case, communications traffic increases. Similarly to the above example, however, reduction in the capacity of the Center Server can be implemented by setting a shorter storage period for the primary storage area beforehand.

The present invention has been set forth above seeing the preferred modes of embodiment. The invention, however, should not be construed as limited to the embodiments described above, and can, of course, be modified and improved as appropriate.

According to the present invention, image data can be processed at the request of the customer, in spite of the fact that not too large a storage capacity is required for image data, by saving only necessary image data for only the necessary period. Also, an image data processing system easier for both the customer and the service provider to use can be supplied without making it necessary for the lab to spend a great deal of time in managing authentication information.

What is claimed is:

1. An image data processing system, comprising:
    an order receiving section to receive an image recording media from a customer with an order, to issue a provisional ID to identify the order to the customer, and to produce plural frames of image data from the image recording media and plural frames of reduced image data in a thumbnail image form on a basis of the plural frames of image data;
    a first storing section to store the plural frames of image data corresponding to the provisional ID issued for the customer;
    a second storing section to store the plural frames of reduced image data corresponding to the plural frames of image data stored in the first storing section and adapted to be accessible through a network;
    an administrative control section to administrate the plural frames of image data stored in the first storing section and the plural frames of reduced image data stared in the second storing section; and
    an authenticating section to conduct an authenticating process for an access to the second storing section from a customer terminal through the network;
    wherein the administrative control section allows the customer to browse the plural frames of reduced image data in the thumbnail image form on a screen of the customer terminal by giving the customer an access right to the second storing section and by transmitting the plural frames of reduced image data in the thumbnail image form from the second storing section to the customer terminal when the authenticating section is accessed with the provisional ID; and
    wherein the administrative control section issues a member ID for the customer in response to a request and allows the customer to conduct an operation for at least one of the reduced image data in the second storing section and the image data stored in the first storing section when the authenticating section is accessed with the member ID by the customer.

2. The image data processing system of claim 1, wherein the operation is a data shifting process to shift the reduced image data in the second storing section or the image data stored in the first storing section to a third storing section or to copy the reduced image data or the image data.

3. The image data processing system of claim 2, wherein the data shifting process shifts only the reduced image data from the second storing section to the third storing section.

4. The image data processing system of claim 2, wherein the data shifting process is a process to take the image data in the first storing section into the third storing section.

5. The image data processing system of claim 2, wherein the data shifting process is a process to shift both of the reduced image data in the second storing section and the corresponding image data in the first storing section to the third storing section.

6. The image data processing system of claim 2, wherein the image data stored in the second storing section are stored for a period shorter that that of the image data stored in the third storing section and are deleted at a predetermined time after the storage.

7. The image data processing system of claim 2, wherein when an access is conducted by the member ID, a printing process is conducted for the image data stored in the third storing section.

8. The image data processing system of claim 7, wherein the administrative control section instructs printing based on the image data stored in the first storing section corresponding to the image data stored in the third storing section.

9. The image data processing system of claim 1, wherein the operation is a process to change an attribute of the reduced image data.

10. The image data processing system of claim 9, wherein the attribute includes information as to whether or not to store the corresponding image data.

11. The image data processing system of claim 9, wherein the reduced image data are correlated with member ID when the attribute of the reduced image data is changed.

12. The image data processing system of claim 1, wherein the first storing section is arranged in each lab server.

13. The image data processing system of claim 12, wherein the second storing section is arranged in a center server.

14. The image data processing system of claim 12, wherein the first storing section is arranged in a hard disk in the lab server.

15. The image data processing system of claim 12, wherein the first storing section is arranged in a center server.

16. The image data processing system of claim 15, wherein the first storing section and the second storing section are the same section.

17. The image data processing system of claim 1, wherein when the image data are shifted from the first storing section to the second storing section, the corresponding image data are correlated with the member ID.

18. The image data processing system of claim 1, wherein the image data are correlated with member ID when the attribute of the image data is changed.

19. An image data processing server system for use with a customer service station having an order receiving section to receive an image recording media from a customer with an order, to issue a provisional ID to identify the order to the customer, and to produce plural frames of image data from the image recording media and plural frames of reduced image data in a thumbnail image form on a basis of the plural frames of image data; a first storing section to store the plural frames of image data corresponding to the provisional ID issued for the customer; a second storing section to store the plural frames of reduced image data corresponding to the plural frames of image data stored in the first storing section and adapted to be accessible through a network, the image data processing server system comprising:

an administrative control section to administrate the plural frames of image data stored in a first storing section and the plural frames of reduced image data stored in the second storing section; and an authenticating section to conduct an authenticating process for an access to the second storing section from a customer terminal through the network;

wherein the administrative control section allows the customer to browse the plural frames of reduced image data in the thumbnail image form on a screen of the customer terminal by giving the customer an access right to the second storing section and by transmitting the plural frames of reduced image data in the thumbnail image form from the second storing section to the customer terminal when the authenticating section is accessed with the provisional ID; and wherein the administrative control section issues a member ID for the customer in response to a request and allows the customer to conduct an operation for at least one of the reduced image data in the second storing section and the image data stored in the first storing section when the authenticating section is accessed with the member ID by the customer.

20. The image data processing server system of claim 19, wherein the operation is a data shifting process to shift the reduced image data stored in the second storing section or the image data stored in the first storing section to a third storing section or to copy the reduced image data or the image data.

21. The image data processing server system of claim 20, wherein the data shifting process shifts only the reduced image data from the second storing section to the third storing section.

22. The image data processing server system of claim 20, wherein the data shifting process is a process to shift the image data in the first storing section to the third storing section.

23. The image data processing server system of claim 20, wherein the data shifting process is a process to shift both of the reduced image data in the second storing section and the corresponding image data in the first storing section to the third storing section.

24. The image data processing server system of claim 20, wherein the reduced image data stored in the second storing section or the image data stored in the firs storing section are stored for a period shorter that that of the image data stored in the third storing section and are deleted at a predetermined time after the storage.

25. The image data processing server system of claim 24, wherein the predetermined time is a validity time of the provisional ID.

26. The image data processing server system of claim 20, wherein an access is conducted by the member ID, a printing process is conducted for the image data stored in the third storing section.

27. The image data processing server system of claim 26, wherein the administrative control section instructs printing based on the image data stored in the first storing section corresponding to the image data stored in the third storing section.

28. The image data processing server system of claim 19, wherein the operation is a process to change an attribute of the reduced image data.

29. The image data processing server system of claim 28, wherein the attribute includes information as to whether or not to store the corresponding image data.

30. The image data processing server system of claim 28, wherein the reduced image data are correlated with member ID when the attribute of the reduced image data is changed.

31. The image data processing server system of claim 28, wherein the server system includes the third storing section.

32. The image data processing server system of claim 28, wherein the server system includes the second storing section.

33. The image data processing server system of claim 28, wherein the server system includes the first storing section.

34. The image data processing server system of claim 28, wherein when the image data are shifted from the first storing section to the second storing section, the corresponding image data are correlated with the member ID.

35. The image data processing server system of claim 28, wherein the image data are correlated with the member ID when the attribute of the image data is changed.

36. The image data processing server system of claim 19, wherein by the operation, the image data after the operation is made a target of an accounting process.

* * * * *